Figure 1:
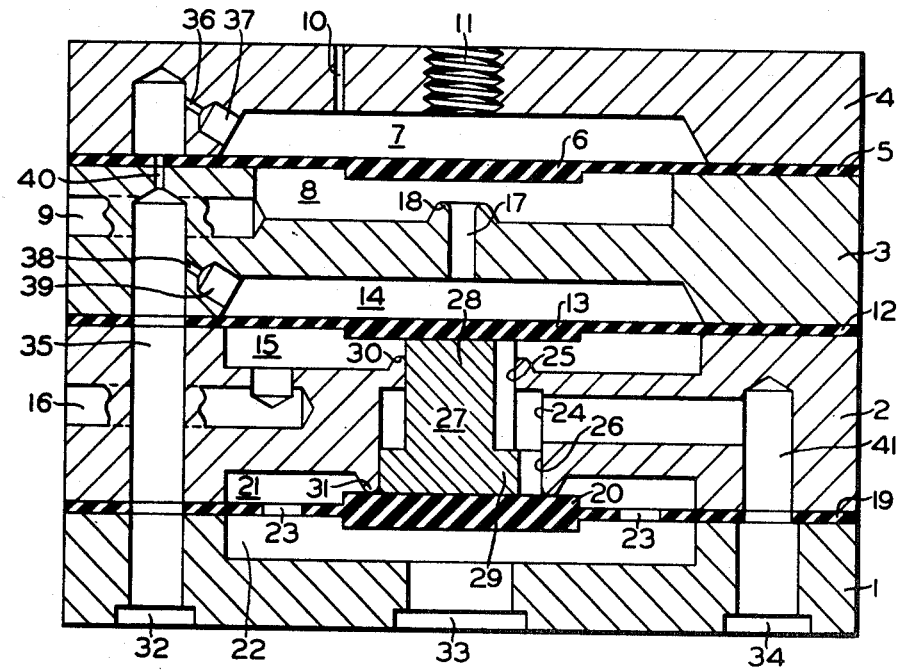

United States Patent

[11] 3,601,155

| [72] | Inventor | Donald Brown |
| | | Monroeville, Pa. |
| [21] | Appl. No. | 7,892 |
| [22] | Filed | Feb. 2, 1970 |
| [45] | Patented | Aug. 24, 1971 |
| [73] | Assignee | Westinghouse Air Brake Company |
| | | Wilmerding, Pa. |

[54] PNEUMATIC LOGIC VALVE DEVICE
8 Claims, 2 Drawing Figs.

[52] U.S. Cl. ................................................. 137/625.66, 251/29
[51] Int. Cl. ..................................................... F16k 11/02, F16k 31/12
[50] Field of Search ............................................. 137/269, 270, 271, 625.6, 625.63, 625.64, 625.66; 251/28, 29

[56] References Cited
UNITED STATES PATENTS

| 3,076,477 | 2/1963 | Brandenberg | 137/625.6 |
| 3,326,239 | 6/1967 | Saint-Joanis et al. | 137/625.66 |
| 3,521,850 | 7/1970 | German | 137/625.66 X |
| 3,529,629 | 9/1970 | Cowan | 137/625.6 |

*Primary Examiner*—Henry T. Klinksiek
*Attorney*—Ralph W. McIntire, Jr.

ABSTRACT: A pneumatic logic valve device characterized by a back pressure sensing arrangement for piloting rapid responsive operation of the device by closing a sensing port or "touch hole," said touch hole requiring a minimum of effort in closing or keeping it closed.

PATENTED AUG24 1971  3,601,155

INVENTOR.
DONALD BROWN

BY Ralph W. McIntire, Jr.

ATTORNEY

PNEUMATIC LOGIC VALVE DEVICE

BACKGROUND OF THE INVENTION

Due to the simplicity, space-saving nature, universal adaptability, and efficient and reliable performance of logic valve devices, the demand for and usage of such devices has become widespread.

One use, for example, for logic valve devices of the type above described, is in a pneumatic apparatus in which operation thereof requires a periodic control impulse or signal to be initiated by an operator. Such an apparatus might be railway vehicle pneumatic brake equipment wherein a safety control mechanism periodically requires the operator to exhibit his alertness by performing a required function and thereby prevent a penalty brake application. Such an apparatus is disclosed, for example, in U.S. Pat. No. 3,232,675, issued to J. F. Ferguson on Feb. 1, 1966 and assigned to the assignee of the present invention. For the purpose of this application it will suffice to say that in the Ferguson apparatus, the operator is periodically, perhaps every 20 to 30 seconds, required to operate a foot pedal which, in a manner disclosed in the above-identified patent, conditions the apparatus in preventing a penalty brake application, which would result automatically if the operator failed to operate the foot petal in response to an alarm signal given by the apparatus.

It is obvious that because of the frequency with which the operator must demonstrate his alertness by performing a certain act, the nature of the required performance by the operator should be one requiring a minimum of physical effort to cause the least amount of fatigue.

SUMMARY OF THE INVENTION

The object of the present invention is to provide a logic valve device which may be employed in apparatus requiring an operator to initiate frequent control signals, said logic valve device requiring a minimum of physical effort by the operator and being rapidly responsive in nature for effecting the control operation without delay.

The logic valve device herein disclosed and embodying the invention is of the diaphragm operated type having a control chamber separated by a diaphragm valve member from a sensing chamber, both said chambers being constantly supplied, at a restricted rate through choke means, with control fluid pressure which normally continually escapes the atmosphere from both chambers unless checked. By using his finger to close a sensing port or "touch hole" opening to the sensing chamber, the operator thereby causes immediate buildup of pressure in the sensing chamber which causes the diaphragm valve member to close the control chamber to atmosphere and thereby effect operation of valve means to cause an output of logic supply pressure at the delivery outlet of the valve device. A modified embodiment eliminates the separate control chamber and utilizes the sensing chamber for performing both the control and sensing functions. With some loss in quickness of response, the modified embodiment functions similarly to the first-described embodiment when a sensing port or touch hole is closed by the operator's finger.

Figure 2:
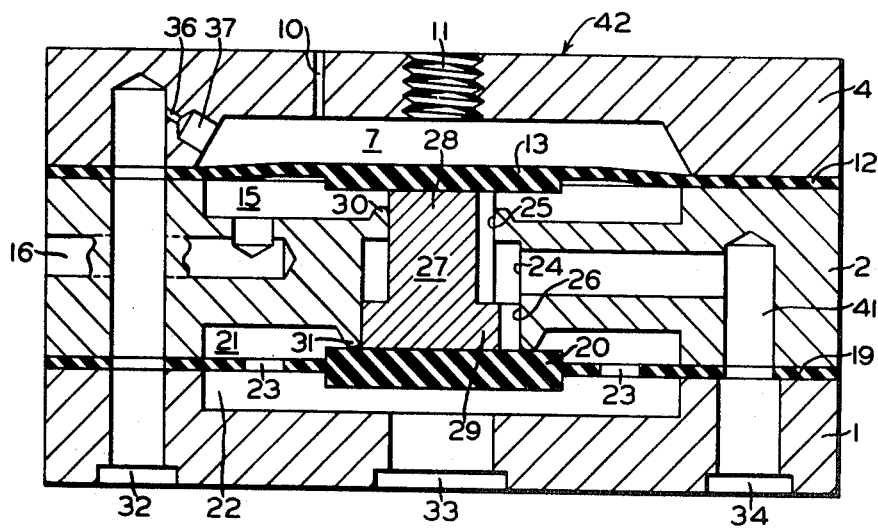

In the drawings,

FIG. 1 is an elevational view, in section, of a logic valve device embodying the preferred structure of the invention; and FIG. 2 is an elevational view, in section, of a modified version of the valve device shown in FIG. 1.

DESCRIPTION AND OPERATION

The logic valve device shown in FIG. 1 comprises a bottom section 1, an intermediate section 2, a control section 3, and a sensor section 4, all being of identical peripheral dimension and form.

An upper resilient diaphragm valve member 5, having its outer peripheral portion clamped between the control and sensor housing sections 3 and 4 (by suitable means not shown) to form a seal therebetween, has an inner central portion 6 which serves as a valve element and also separates a sensing chamber 7 formed adjacent the lower face of said sensor housing section from an exhaust chamber 8 formed adjacent the upper face of said control housing section. Exhaust chamber 8 is communicated to atmosphere via a passageway 9 formed in control housing section 3, while sensing chamber 7 is communicated to atmosphere via a choke 10 of predetermined flow capacity formed in sensor housing section 4. Sensor housing section 4 is also provided with a "touch hole" or sensing port 11 which also communicates sensing chamber 7 to atmosphere for a purpose to be hereinafter disclosed.

An intermediate resilient diaphragm valve member 12 having its outer periphery clamped between control housing section 3 and intermediate housing section 2 (by suitable means not shown) to form a seal therebetween, has an inner central portion 13 which serves as a movable abutment and valve element, and also separates a control chamber 14 formed adjacent the lower face of said control housing section from an atmospheric chamber 15 formed adjacent the upper face of said intermediate housing section. Atmospheric chamber 15 is communicated to atmosphere via a passageway 16 formed in termediate housing section 2, while exhaust chamber 8 and control chamber 14 are interconnected via a passageway 17 extending coaxially through the central interior portion of control housing section 3, said passageway having an annular valve seat 18 encircling the end thereof opening into said exhaust chamber.

A lower resilient diaphragm valve member 19 having its outer periphery clamped between intermediate housing section 2 and bottom housing section 1 (by suitable means not shown) to form a seal therebetween, has an inner central portion 20 which serves as a movable abutment and a valve element, and also separates a delivery chamber 21 formed adjacent the lower face of said intermediate housing section from a supply chamber 22 formed adjacent the upper face of said bottom housing section. Delivery chamber 21 and supply chamber 22 are in constant intercommunication via a plurality of apertures 23 formed in the central portion 20 of diaphragm valve member 19.

Intermediate housing section 2 is provided with a bore 24 extending coaxially through the central interior portion thereof, said bore comprising an upper smaller diameter portion 25 adjacent the upper face of said intermediate housing section and a lower larger diameter portion 26 adjacent the lower face of said housing section. A fluted valve operator 27 comprising smaller and larger diameter portions 28 and 29 corresponding to the smaller and larger diameter portions 25 and 26 of bore 24, respectively, is coaxially slidably disposed in said bore for reciprocal movement therein. The upper end of bore 24 opening to atmospheric chamber 15 is encircled by an upper annular valve seat 30, and the lower end of said bore opening to delivery chamber 21 is encircled by an annular valve seat 31, the diameters of said upper and lower valve seats corresponding, of course, to the respective diameters of the upper and lower portions 25 and 26 of said bore.

The valve operator 27 is reciprocably operable, in a manner to be hereinafter disclosed, between an upper limit or cutoff position and a lower limit or supply position. In the cutoff position of valve operator 27, central portion 13 of diaphragm valve member 12 is unseated relative to valve seat 30 and central portion 20 of diaphragm valve member 19 is seated on valve seat 31, while in the supply position of said valve operator, said central portion of diaphragm valve member 12 is seated on valve seat 30 and said central portion of diaphragm valve member 19 is unseated relative to valve seat 31.

The bottom housing section 1 is provided with a control port 32, a supply inlet 33 and a delivery outlet 34.

Control port 32 connects to one end of a control passageway 35 consisting of aligned passageway segments formed in the several respective housing sections in traverse relation thereto, the other end of said control passageway being connected to the sensing chamber 7 in sensor housing section 4 via a branchoff choke 36 interposed between said other end of said control passageway and a branch passageway 37 formed in said sensor housing section. Control chamber 14 is also communicated to control passageway 35 via a branchoff choke 38 interposed between said control passageway and a branch passageway 39 formed in control housing section 3. A third choke 40 is formed in control passageway 35 at a point located between the respective points at which branchoff chokes 36 and 38 open to said control passageway.

Although control passageway 35, through which fluid pressure is supplied to sensing chamber 7, has two chokes 40 and 36, arranged in series therein, it should be obvious to one skilled in the art that one choke of desired flow capacity would serve the same purpose. Because the various housing sections normally making up logic valve devices are either interchangeable or may be individually substituted one for the other among several devices to fit the particular function desired, each of the housing sections 3 and 4, in this instance, happens to be provided with respective chokes 40 and 36, though obviously not essential to the invention.

Supply inlet 33 opens directly into supply chamber 22, and delivery outlet 34 connects to bore 24, at a point intermediate the end thereof, via a delivery passageway 41 comprising registering segments formed in the respective bottom and intermediate housing sections 1 and 2.

In considering the operation of the logic valve device shown in FIG. 1, if it be assumed that supply fluid pressure is present at supply inlet 33 and that control fluid pressure is present at control port 32 and, therefore, in passageway 35, such control fluid pressure simultaneously flows to control chamber 14 via choke 38 and branch passageway 39 and to sensing chamber 7 via chokes 40 and 36 and branch passageway 37. Unless checked in the manner to be set forth hereinafter, fluid pressure flowing into control chamber 14 (at the restricted rate determined by the flow capacity of choke 38) escapes to atmosphere via passageway 17, exhaust chamber 8, and passageway 9; and fluid pressure flowing into sensing chamber 7 (at the restricted rate determined by the flow capacity of the smaller of the chokes 40 and 36, if one be smaller) escapes to atmosphere unrestrictedly via touch hole 11 and, at this time, to a negligible degree via choke 10.

Since, as was above noted, the use of both the serially disposed chokes 40 and 30 is not essential to the operation of the valve device, for the purpose of simplifying the following description of operation of the valve device shown in FIG. 1, it will be assumed that choke 36 is of smaller flow capacity, that is, the desired predetermined capacity, than choke 40, and therefore is the effective choke in the functioning of said valve device. In the description that follows, therefore, the presence of choke 40 will be disregarded.

If the operator wishes to effect a control impulse, he simply covers touch hole 11 with his finger. Due to the restrictive nature of choke 10, pressure in sensing chamber 7 immediately begins to effectively build up over the upper area of central portion 6 of diaphragm member 5 which immediately moves to a seated position on valve seat 18 thereby cutting off further exhaust of fluid pressure from control chamber 14 via passageway 17, chamber 8 and passageway 9. By necessity, the flow rate or capacity of choke 10 must be less than that of choke 36 in order to obtain buildup of fluid pressure in sensing chamber 7 to produce consequent seating of diaphragm valve member 5 on valve seat 18 when touch hole 11 is closed. The dimension of choke 10 is further determined not only by the rate at which pressure buildup in chamber 7 is to occur to produce the desired quickness of response, but also by the desired maximum force or resistance, caused by maximum buildup of such pressure, which the operator must comfortably endure in maintaining touch hole 11 closed during a sustained period of operation, if necessary.

With control chamber 14 thus closed to atmosphere, fluid pressure therein also immediately begins to effectively buildup over the upper area of central portion 13 of diaphragm member 12, which is thereby immediately moved downwardly and carries with it valve operator 27 to its supply position, above described, in which position supply pressure at inlet 33 may now flow to outlet 34 via chamber 22, apertures 23, past unseated diaphragm valve member 19, through bore 24, and passageway 41, to thereby produce a control impulse or signal. Unlike the dimensional relationship of chokes 10 and 36, which are serially disposed relative to each other, the dimension of choke 38 is independent of that of choke 36 or choke 10, said choke 38 being disposed in parallel relation to chokes 36 and 10. The dimension of choke 38 is, therefore, simply determined by the rate at which it is desired to effect charging of control chamber 14, when diaphragm valve member 5 is seated on valve seat 18, to produce the desired quickness of response by diaphragm valve member 12 in moving valve operator 27 to its supply position.

The fast response of diaphragm valve member 12 to pressure buildup in control chamber 14 is due not only to rapid buildup of pressure in said control chamber, but also to the fact that the upper area of central portion 13 of diaphragm valve member 12, on which said pressure buildup acts to produce the motive force thereon, is much larger than the effective area of diaphragm valve member 19 on which fluid pressure in supply chamber 22 acts in an opposing relation to said motive force. The effective area of diaphragm valve member 19 (when seated on valve seat 31) subject to opposing fluid pressure in supply chamber 22 and which the motive force of diaphragm valve member 12 must overcome, in equivalent to that area enclosed within said valve seat, which is relatively small compared to the upper area of diaphragm valve member 12 subject to pressure in chamber 14. Immediately upon unseating of central portion 20 of diaphragm 19 from valve seat 31, pressure on both sides (by way of apertures 23) of said central portion are balanced, so that the now unopposed motive force acting on diaphragm member 12 moves the valve operator 27 to its supply position with a snap action.

In terminating the control signal or output it delivery outlet 34, the operator simply uncovers touch hole 11 to thereby allow fluid pressure in sensing chamber 7 to immediately vent unrestrictedly to atmosphere via said touch hole. Control chamber pressure present in passageway 17 is effective for initiating unseating of diaphragm valve member 5 from valve seat 18, thereby exposing the entire underside of said diaphragm valve member to such control chamber pressure and effecting undelayed opening of said passageway, and therefore control chamber to exhaust chamber 8. Control chamber pressure is immediately dissipated to atmosphere via exhaust chamber 8 and passageway 9, thus rendering supply fluid pressure prevailing in bore 24 and acting on the underside area of diaphragm valve member 12 enclosed within valve seat 30, effective for unseating said diaphragm valve member from said valve seat and thereby exposing the entire underside of said diaphragm valve member to said supply fluid pressure. Prompt upward movement of diaphragm valve member 12 is thus effected, and pressure in passageway 41 and bore 24 is immediately vented to atmosphere via atmospheric chamber 15 and passageway 16. Prompt dissipation of fluid pressure in passageway 41 and bore 24 creates a momentary pressure differential on opposite sides of diaphragm valve member 19, with the momentary greater pressure acting on the underside thereof. Such momentary pressure differential effects prompt upward movement of diaphragm valve member 19 which carries valve operator 27 with it to its cutoff position, above defined, to thereby terminate the control output at delivery outlet 34.

A logic valve device 42 shown in FIG. 2 is a simplified device and differs structurally from that shown in FIG. 1 in that the entire control housing section 3 and the diaphragm valve member 5 have been omitted from the valve device, the sensor housing section 4 being mounted directly adjacent intermediate section 2. Since all the components of the device 42 shown in FIG. 2 are identical to corresponding components included in the valve device shown in FIG. 1, said components of the device 42, for purposes of simplicity, have been identified by corresponding reference numerals.

Since operation of the valve device 42 is very similar to that of the valve device shown in FIG. 1, it is sufficient to say that, for purposes of producing a control signal or output at outlet 34, the valve device 42 is also actuated by closing the touch hole 11 to thereby effect pressure buildup on diaphragm valve member 12 in sensing chamber 7 and consequent operation of the valve operator to its supply position, above described. Termination of the output at outlet 34 is effected by opening or uncovering the touch hole 11.

Since the sensing chamber 7 in the valve device 42 assumes both the functions performed by the sensing chamber 7 and control chamber 14 in the valve device shown in FIG. 1, the response of the valve device 42 is somewhat slower in that the fluid pressure supplied to said sensing chamber is supplied through the single choke 36 only, rather than through parallel chokes such as the chokes 36 and 38 in the valve device of FIG. 1, which feed the sensing chamber 7 and control chamber 14 simultaneously.

Having now described the invention, what I describe as new and desire to secure by Letters Patent, is:

1. A pneumatic valve device comprising:
   a. a housing having formed therein:
      i. pressure chamber means,
      ii. a control port via which said pressure chamber means is charged with control fluid pressure,
      iii. a fluid pressure inlet to which fluid pressure may be supplied,
      iv. a fluid pressure outlet from which fluid pressure may be delivered,
      v. an atmospheric passageway, and
      vi. delivery passage means via which said fluid pressure outlet may be selectively connected to one of said fluid pressure inlet and said atmospheric passageway;
   b. diaphragm means subject to control fluid pressure in said pressure chamber means for controlling communication between said delivery passage means and said atmospheric passageway;
   c. a first diaphragm valve member for controlling communication between said delivery passage means and said fluid pressure inlet; and
   d. a reciprocably operable valve operator coaxially disposed relative to said diaphragm means and said first diaphragm valve member with one end of said valve operator making abutting contact with the diaphragm means and the other end making abutting contact with said first diaphragm valve member,
   e. said valve operator normally assuming a cutoff position, in which said first diaphragm valve member cuts off a supply communication between said fluid pressure inlet and said delivery passage means and said diaphragm means opens a vent communication between said atmospheric passageway and said delivery passage means, and being operable responsively to pressurization of said pressure chamber means to a predetermined degree exceeding atmospheric pressure, to a supply position in which said diaphragm means closes said vent communication and said first diaphragm valve member opens said supply communication;

wherein the improvement comprises:
   f. first choke means interposed in said control port and having a certain flow capacity for restricting flow of the fluid pressure to said pressure chamber means accordingly; and
   g. a finger port in said housing via which fluid pressure flowing into said pressure chamber means normally escapes at an unrestricted rate for maintaining pressure in said pressure chamber means at atmospheric pressure, said finger port being effective when closed for causing buildup of pressure in said pressure chamber means to said predetermined degree exceeding atmospheric pressure.

2. A pneumatic logic valve device, as set forth in claim 1, further characterized by second choke means disposed in said housing for communicating said pressure chamber means to atmosphere in parallel relation to said finger port, said second choke means being of lesser flow capacity than said first choke means.

3. A pneumatic logic valve device, as set forth in claim 2, wherein said pressure chamber means comprises a first chamber, a second chamber, exhaust means, and a first valve seat interposed in said exhaust means and through which said second chamber may be exhausted to atmosphere, both said first and said second chambers being charged simultaneously with control fluid pressure via said first choke means, said first chamber being normally communicated to atmosphere via said finger port and said second choke means, and said second chamber being normally open to atmosphere via said exhaust means, said diaphragm means being operable, responsively to buildup of control pressure in said first chamber upon closure of said finger port, to a seated position on said first valve seat for closing said second chamber to atmosphere and effecting consequent buildup of control pressure therein and operation of said valve operator to its said supply position.

4. A pneumatic logic valve device, as set forth in claim 3, further characterized by:
   a. a fluid pressure supply chamber formed in said housing via which said fluid pressure inlet may be communicated with said delivery passage means, said first diaphragm valve member being operably disposed in said supply chamber between said fluid pressure inlet and said delivery passage means, and
   b. a second valve seat disposed in said supply chamber on the side of said first diaphragm valve member adjacent the delivery passage means, said first diaphragm valve member being operable to a seated position on said second valve seat by movement of said valve operator to its said cutoff position to effect cutoff of said supply communication and to an unseated position relative thereto by movement of the valve operator to its said supply position to effect opening of said supply communication.

5. A pneumatic logic valve device, as set forth in claim 3, further characterized by:
   a. an atmospheric chamber formed in said housing between said atmospheric passageway and said delivery passage means, and
   b. a third valve seat disposed in said atmospheric chamber and via which said delivery passage means and the outlet may be vented to said atmosphere; and
   wherein said diaphragm means comprises:
   c. a second diaphragm valve member operably disposed in the housing and separating said first chamber from said second chamber, said second diaphragm valve member being operable in response to said buildup of fluid pressure in said first chamber to a seated position on said first valve seat for closing said second chamber to atmosphere and effecting said buildup of fluid pressure therein, and
   d. a third diaphragm valve member operably disposed in said housing and separating said second chamber from said atmospheric chamber, said third diaphragm valve member being operable in response to said buildup of fluid pressure in said second chamber for moving said valve operator to its said supply position.

6. A pneumatic logic valve device, as set forth in claim 5, wherein said exhaust means comprises:
   a. an exhaust chamber formed in said housing adjacent the side of said second diaphragm valve member opposite said first chamber,
   b. an exhaust passageway connecting said exhaust chamber to atmosphere, and
   c. a connecting passageway connecting said exhaust chamber to said second chamber, said first valve seat formed at the end of said connecting passageway opening to said exhaust chamber; and
   wherein said delivery passage means comprises:

d. a bore formed coaxially in said housing with one end, on which said third valve seat is formed, opening to said atmospheric chamber and the other end, on which said second valve seat is formed, opening to said supply chamber, said valve operator being operably disposed in said bore with a radial space therebetween, and
e. a delivery passageway having one end opening into said bore and the other end connected to said fluid pressure outlet.

7. A pneumatic logic valve device comprising:
a. a housing having formed therein:
  i. a pressure-sensing chamber,
  ii. control passage means via which said sensing chamber may be charged with fluid pressure,
  iii. a atmospheric chamber,
  iv. a delivery chamber axially spaced from said atmospheric chamber,
  v. a supply chamber,
  vi. a coaxially disposed bore having one end open to said atmospheric chamber and the other end open to said delivery chamber,
  vii. a first valve seat surrounding said one end of said bore,
  viii. a second valve seat surrounding the other end of said bore,
  ix. an inlet port via which fluid pressure may be supplied to said supply chamber,
  x. an outlet port via which fluid pressure may be delivered from said delivery chamber, and
  xi. a delivery passageway having one end opening to said bore intermediate the ends thereof and having the other end connected to said delivery port;
b. a first diaphragm valve member operably disposed in said housing and separating said pressure sensing chamber from said atmospheric chamber;
c. a second diaphragm valve member operably disposed in said housing and separating said delivery chamber from said supply chamber, said second diaphragm valve member having at least one aperture therein via which said supply chamber is communicated with said delivery chamber; and
d. a valve operator reciprocably disposed in said bore with a radial space therebetween, one end of said valve operator making abutting contact with said first diaphragm valve member and the other end making abutting contact with said second diaphragm valve member,
e. said valve operator normally assuming a cutoff position in which said first diaphragm valve member is moved to an unseated position relative to said first valve seat for opening a vent communication between said outlet port and said atmospheric chamber, and in which cutoff position said second diaphragm valve member occupies a seated position on said second valve seat to cut off a supply communication between said delivery chamber and said delivery passageway, said valve operator being operable responsively to pressurization of said pressure sensing chamber to a degree exceeding atmospheric pressure, to a supply position in which said first diaphragm valve member occupies a seated position on said first valve seat to close said vent communication, and said second diaphragm valve member is moved to an unseated position relative to said second valve seat to open said supply communication;
wherein the improvement comprises:
f. a first choke of predetermined flow capacity interposed in said control passage means for restricting such charging of said sensing chamber accordingly; and
g. a finger port in said housing and via which, when open, fluid pressure supplied to said sensing chamber may escape unrestrictedly to atmosphere and, when closed, builds up to said degree exceeding atmospheric pressure for effecting operation of said first diaphragm valve member to its said seated position and of said valve operator to its said supply position.

8. A pneumatic logic valve device, as set forth in claim 7, further characterized by a second choke in said housing of a lesser flow capacity than said first choke and via which fluid pressure supplied to said sensing chamber may bleed to atmosphere in parallel relation to said finger port, said second choke being effective, when said finger port is closed, for limiting buildup of fluid pressure in said sensing chamber to a degree determined by the differential in the respective flow capacities of said first and second chokes.